Patented Dec. 15, 1925.

1,565,773

UNITED STATES PATENT OFFICE.

EDMUND BARTA, OF CHICAGO, ILLINOIS.

EMBALMING FLUID.

No Drawing. Application filed April 7, 1924. Serial No. 704,861.

*To all whom it may concern:*

Be it known that I, EDMUND BARTA, a citizen of Hungary, residing at Chicago, in the county of Cook and State of Illinois, have invented certain new and useful Improvements in an Embalming Fluid, of which the following is a specification.

The principal object of the present invention is the production of an embalming fluid which will preserve the body of a corpse and retain its life-like appearance for a very long time.

A further object of the invention is to provide an embalming fluid which will prevent decay of the body and will further be inexpensive.

My embalming fluid consits of a mixture of the following chemicals in the proportions set forth:

3 per cent corrosive bichloride of mercury ($HgCl_2$).

½ per cent sodium chlorid (NaCl).

¼ per cent sodium hydroxid or ¼ per cent potassium hydroxid (NaOH or KOH).

1¼ per cent crystallized thymol ($C_{10}H_{13}OH$).

1½ per cent crystallized camphor.

¼ per cent concentrated solution of watered eosin rubrum which is a red dye used for the coloration of animal tissues ($C_{20}H_8O_5Br_4$).

93 per cent formol, 40 per cent concentrated formaldehyde.

5 or 6 drops of bergamot oil which is a yellow colored volatile oil, having no known chemical formula.

The above chemicals are thoroughly mixed together in the proportions set forth and will form the embalming fluid which when used will preserve the body of a corpse for a very long time and will further cause the retention of the life-like appearance by the corpse. Further my improved embalming fluid will prevent the decay and may be further manufactured at a very low cost.

Having thus described my invention, what I claim is:

An embalming fluid consisting of bichlorid of mercury, sodium chlorid, sodium hydroxid, crystallized thymol, crystallized camphor, eosin rubrum, formol, concentrated formaldehyde, and bergamot oil.

In testimony whereof I affix my signature.

DR. EDMUND BARTA.